(No Model.)

S. J. McDONALD.
DOUBLETREE FOR VEHICLES.

No. 525,994. Patented Sept. 11, 1894.

WITNESSES:
F. McArdle
Wm. C. Patton

INVENTOR
S. J. McDonald
BY Munn & Co
ATTORNEYS.

UNITED STATES PATENT OFFICE.

SAMUEL J. McDONALD, OF GALLATIN, MISSOURI, ASSIGNOR, BY MESNE ASSIGNMENTS, TO SUSAN M. McDONALD, OF SAME PLACE.

DOUBLETREE FOR VEHICLES.

SPECIFICATION forming part of Letters Patent No. 525,994, dated September 11, 1894.

Application filed April 17, 1894. Serial No. 507,825. (No model.)

*To all whom it may concern:*

Be it known that I, SAMUEL J. MCDONALD, of Gallatin, in the county of Daviess and State of Missouri, have invented a new and useful Improvement in Doubletrees for Vehicles, of which the following is a full, clear, and exact description.

My invention relates to improvements in doubletrees for vehicles, and has for its object to provide a simple, inexpensive attachment for such a device, which will obviate the usual tendency of the doubletree to rock on its coupling bolt forwardly and downwardly under draft strain, and also to prevent the elongation of the bolt hole wherein the coupling bolt is located, as sometimes occurs in the connections ordinarily provided for doubletrees to swivel connect them to the draft pole of the vehicle.

To these ends my invention consists in the construction and combination of parts, as is hereinafter described and claimed.

Reference is to be had to the accompanying drawings, forming a part of this specification, in which similar figures of reference indicate corresponding parts in all the views shown.

Figure 1:
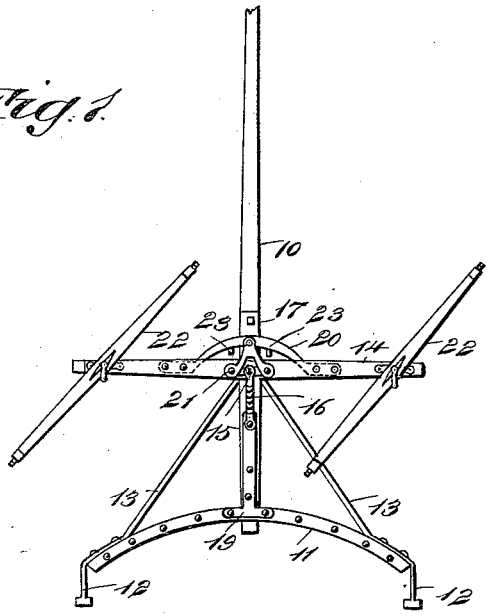
Figure 2:
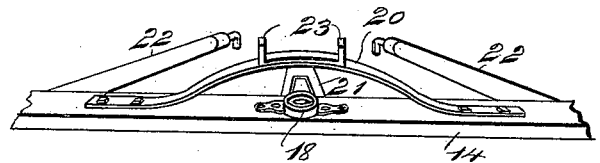
Figure 3:
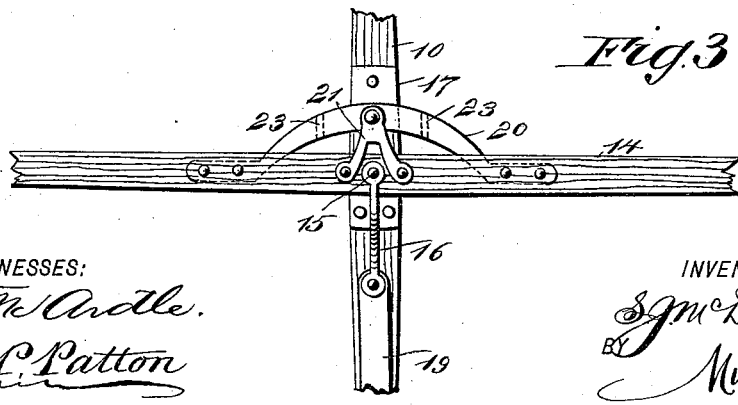

Figure 1 is a plan view of the improvement applied to a vehicle draft pole and doubletree. Fig. 2 is an enlarged reverse plan view in part of a doubletree, two singletree portions, and the improvement attached to the doubletree; and Fig. 3 is an enlarged plan view of the improvement secured in place on enlarged doubletree and draft pole portions.

In the drawings, 10 indicates a vehicle draft pole in part, the rear portion shown having a transverse draft bar 11 secured on it at the longitudinal center of the bar, that has the usual joint irons 12 affixed to its ends for a hinged connection of the pole with the front axle of a vehicle, the diagonal brace bars 13, serving to stiffen the junction of the pole and bar in the ordinary manner.

At a suitable distance from the draft bar 11 the doubletree 14, is pivoted on the upper side of the pole 10 by a pintle bolt 15, which passes through aligned holes in the link bar 16, wear plate 17, and central perforation of the doubletree, which is reinforced by the plate 18, the link bar being also secured by its rear end on a longer T-shaped reinforce plate 19, that is bolted with its longer limb on the top of the pole at its rear end, allowing the cross piece of the T-plate to rest on and be bolted to the draft bar 11.

The essential features of improvement consist in the provision of the arched carrier bar 20, and furcated brace plate 21. The carrier bar comprises a curve-bent metal piece which is flattened at its end portions that are bent edgewise so as to align them and permit their bolted attachment on the lower side of the doubletree 14, the arched portion of the carrier bar projecting forwardly so as to rest on the wear plate 17, which extends in advance of said carrier bar on the pole, the bar having its arched body so set as to adapt it to have a free sliding engagement with the wear plate and permit the doubletree to swing on its pintle bolt without binding.

On the upper surface of the doubletree 14, the forked brace plate 21 is secured so as to have its limbs straddle the forward end of the link bar 16, the main limb of the plate being riveted on the carrier bar 20 at its longitudinal center. The ordinary whiffletrees 22, are pivotally secured on the end portions of the doubletree 14, for the harnessed connection of draft animals to the latter. It will be seen that the carrier bar 20, by its form and manner of attachment to the doubletree, is adapted to prevent a forward and downward strain on the pintle bolt of the doubletree, which will obviate the tendency usually manifested in such devices not having the improvements, to chafe the bolt hole in the doubletree so as to weaken the latter, and injuriously wear on the pintle bolt.

At each side of the pole 10 a depending check ear 23 is formed on or secured to the lower side of the carrier bar, these projections being so separated that a sufficient swinging movement of the doubletree is permitted, while undue vibration is checked, which will insure the free action of the whiffletrees 22, and their avoidance of interference with the pole 10. The provision of the furcated brace plate 21, is advantageous, as from its location and connection with the arched carrier bar 20, together with its attachment to the doubletree, it is adapted to co-act with the carrier bar to brace the doubletree against a forward and downward rocking movement, without retarding the necessary swinging movement of the doubletree and whiffletrees in service.

Having thus fully described my invention, I claim as new and desire to secure by Letters Patent—

1. The combination with a draft pole, and a doubletree pivoted thereon, of a curved bar having its ends secured to the doubletree and provided on its under side with spaced ears, said ears projecting down on opposite sides of the pole, substantially as described.

2. The combination with a draft pole, and a doubletree pivoted thereon, of a curved bar having its ends secured to the double tree and provided on its under side with spaced ears, said ears projecting down on opposite sides of the pole, and a forked brace plate secured to the doubletree and to the curved bar, substantially as described.

3. The combination with a draft pole, and a doubletree pivoted thereon, of a link bar having its rear end secured to the pole and its forward end to the doubletree by the pivot of the said doubletree, a curved carrier bar having its ends secured to the doubletree and projecting forwardly over the pole, said bar being provided on its under side with spaced ears, which project down on opposite sides of the pole, and a forked brace secured to the doubletree and to the curved bar, substantially as described.

SAMUEL J. McDONALD.

Witnesses:
J. E. CHAPMAN,
W. R. HANDY.